F. L. CANTRALL.
STEERING WHEEL.
APPLICATION FILED APR. 27, 1917.

1,365,373.

Patented Jan. 11, 1921.
2 SHEETS—SHEET 1.

Witnesses
C. P. Hardy
W. F. Davidson

Inventor
F. L. Cantrall
By ...........
Attorney

F. L. CANTRALL.
STEERING WHEEL.
APPLICATION FILED APR. 27, 1917.
1,365,373.
Patented Jan. 11, 1921.
2 SHEETS—SHEET 2.
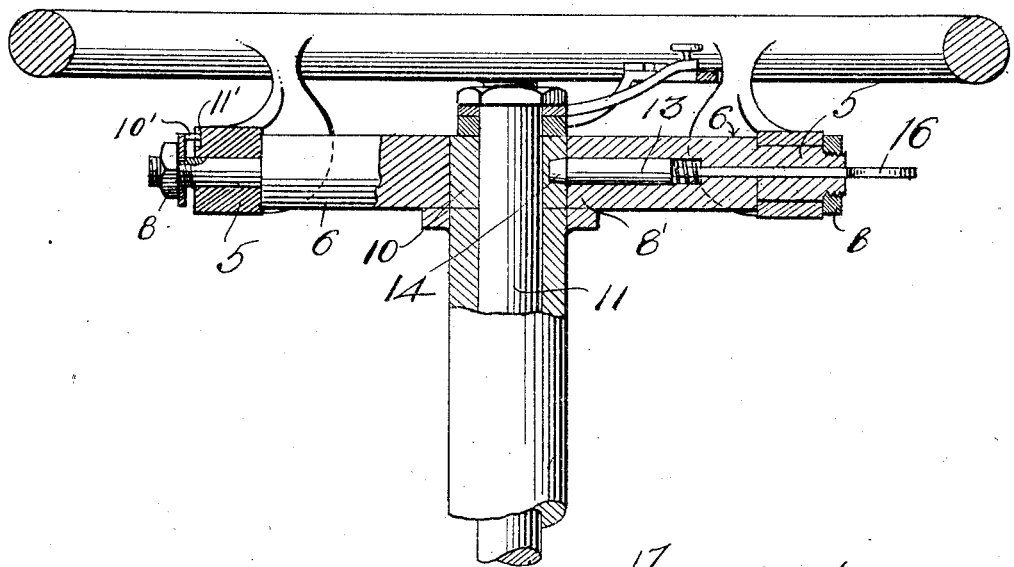
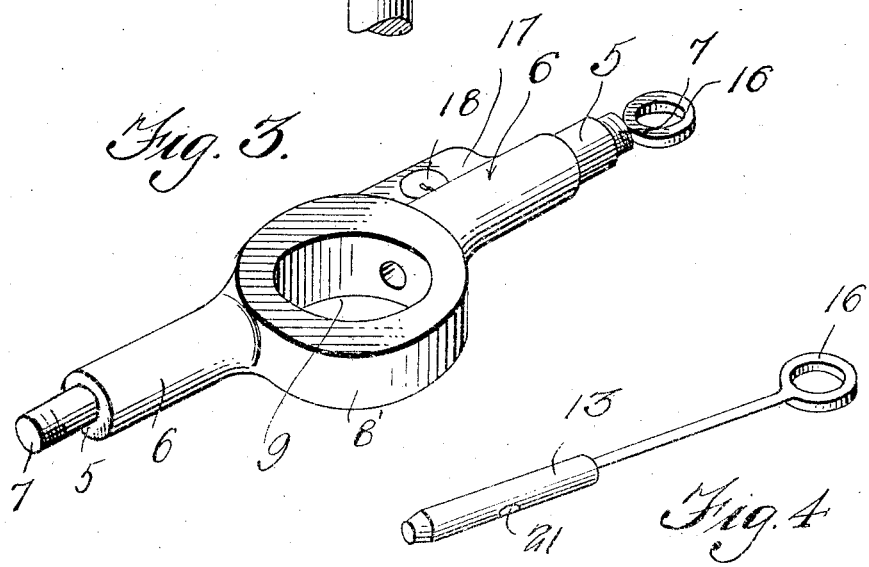
Witnesses
C. R. Hardy
W. F. Davidson
Inventor
F. L. Cantrall
By
Attorney

UNITED STATES PATENT OFFICE.

FORREST L. CANTRALL, OF ALTURAS, CALIFORNIA, ASSIGNOR, BY MESNE ASSIGNMENTS, TO LIBERTY PATENTS SYNDICATE, A CORPORATION OF NEVADA.

STEERING-WHEEL.

1,365,373.  Specification of Letters Patent.  Patented Jan. 11, 1921.

Application filed April 27, 1917. Serial No. 164,936.

*To all whom it may concern:*

Be it known that I, FORREST L. CANTRALL, a citizen of the United States, residing at Alturas, in the county of Modoc and State of California, have invented certain new and useful Improvements in Steering-Wheels; and I do hereby declare the following to be a full, clear, and exact description of the invention, such as will enable others skilled in the art to which it appertains to make and use the same.

This invention relates to improvements in a steering wheel and has for one of its objects, the provision of a device of this character, whereby the steering wheel may be readily tilted in relation to the steering post and out of the way of the operator, regardless at what angle the front wheels are positioned.

Another object of this invention is the provision of means, whereby the steering wheel may be turned freely of the steering post so that the same may be tilted out of the way regardless at what angle the front wheels occupy.

A further object of this invention is to provide means for locking the steering wheel free of the steering post, so that the automobile is locked against theft, owing to the inability to turn the steering post by the steering wheel.

A still further object of this invention is the provision of a steering wheel of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

Figure 1:
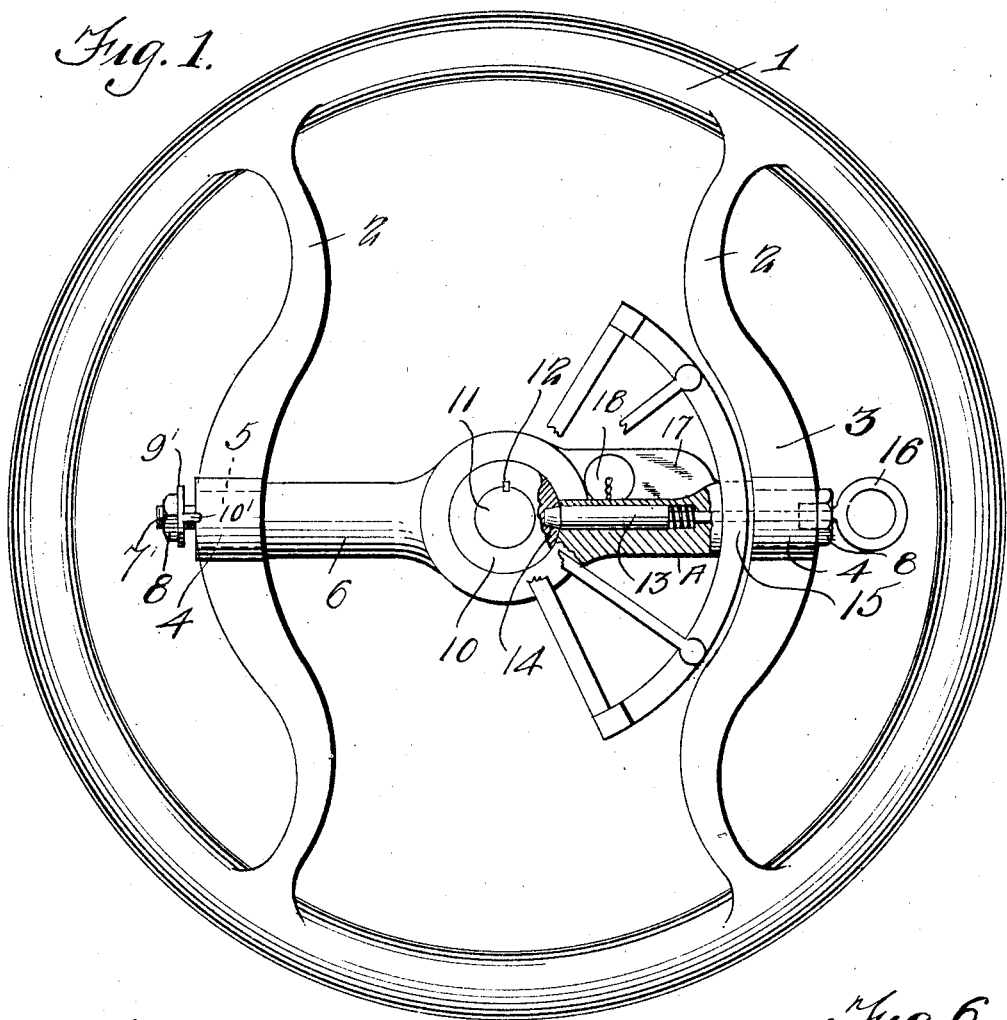
Figure 5:
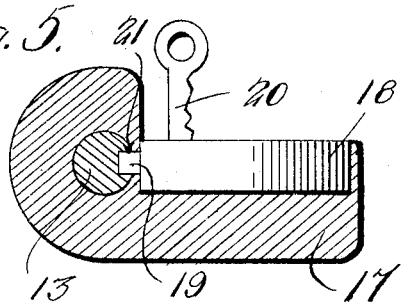
Figure 6:
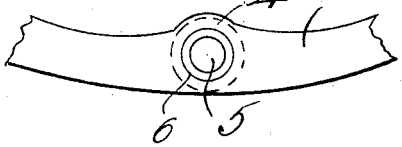

For a complete understanding of my invention, reference is to be had to the following description and accompanying drawing, in which:

Figure 1 is a top plan view partly in section of a steering wheel, constructed in accordance with my invention, Fig. 2 is a fragmentary vertical sectional view of the same, Fig. 3 is a perspective view of the means for connecting the spiders of the steering wheel with the steering post, Fig. 4 is a perspective view of the locking pin for locking the steering wheel to the steering post, Fig. 5 is a detail sectional view illustrating a lock for holding the locking pin against movement, Fig. 6 is a fragmentary plan view of a journal.

Referring in detail to the drawing, the numeral 1 indicates a ring of a steering wheel having formed thereon or secured thereto, relatively spaced spiders 2, which are curved outwardly from each other as illustrated at 3. The curved portions of the spiders 2 are provided with journals 4 for receiving the reduced ends 5 of the connecting member 6. The reduced ends 5 are of a sufficient size to frictionally fit the journals 4 for preventing the spiders 2 from moving upon the reduced ends 5 accidentally.

Screwthreaded extensions 7 are formed upon the reduced ends 5 for receiving nuts 8 for retaining the connecting member 6 in connection with the spiders 2.

The connecting member 6 has formed intermediate its ends an enlarged circular body portion 8' having a cylindrical opening 9 to rotatably receive a barrel 10, which is keyed to a steering post 11 and illustrated at 12. The arm portion A of the connecting member 6 is of hollow formation and has slidably mounted therein, a spring actuated locking pin 13, which is adapted to normally engage the notch 14 in the barrel 10 for locking the connecting member 6 against rotation upon the barrel 10. A rod 15 is formed upon the locking pin 13 and extends exteriorly of the arm portion A and has formed thereon, a ring or handle 16 for withdrawing the pin 13 from the nut 14 in the barrel 10 when desiring to free the connecting member 6 from the steering post.

The arm portion A of the connecting member 6 is provided with an enlargement 17, which is provided with a recess for receiving a suitable lock 18, which may be of any desired construction, suitable for the purpose and having a sliding bolt 19 movable in and out of the lock by a key 20. The sliding bolt 19 is adapted to engage a notch 21 in the locking pin 13 to hold said locking pin from engagement with the barrel 10, so as to prevent turning of the steering post by the steering wheel, thus locking the automobile against theft.

In operation, when it is desired to tilt the steering wheel with relation to the steering post and when the front wheels of an automobile are disposed at an angle, the locking pin 13 is withdrawn by the handle 16 from engagement with the hub 10 and locked in this position by the sliding bolt 19 of the lock 18. The steering wheel then may be turned freely of the steering post and barrel 10 and positioned so that the same can be tilted upwardly or downwardly in relation to the steering post so as to occupy a position, which will be out of the way of the operator getting into and out of the automobile. When the pin 13 has been locked by the lock 18 and the key removed from the lock, it is impossible to steer the automobile, owing to the fact that the steering wheel is capable of moving freely with relation to the steering post.

The journals formed within the spiders are of the friction type for receiving the reduced portions 5 of the connecting member 6 so that the steering wheel will normally maintain an operative or steering position, and when desiring to tilt the steering wheel, it is necessary to place pressure upon the steering wheel to turn the spiders upon the reduced portions 5 of the connecting member 6.

A washer 9' is keyed on the reduced portion 7 and has a resilient tongue 10' adapted to engage the recess 11' of the journal formed on one of the spiders 2, so that the steering wheel will be locked against accidental movement.

While I have shown and described the preferred embodiment of my invention, it will be understood that minor changes in construction, combination and arrangement of parts may be made without departing from the spirit and scope of the invention as claimed.

Having thus described my invention, I claim:

1. A steering wheel comprising a hand ring, spiders secured to the hand ring, a connecting member journaled to said spiders and mounted for rotation on a steering post, and means for locking the connecting member for rotation with the steering post.

2. A steering wheel comprising a hand ring, spiders secured to the hand ring, a connecting member journaled to the spiders, a hub journaled in the connecting member and secured to a steering post, and means for locking the connecting member against rotation upon the hub.

3. A steering wheel comprising a hand ring, spiders secured to said ring, a connecting member journaled to said spiders an enlarged portion formed upon the connecting member and having a circular opening, a hub journaled in the opening and secured to a steering post, and means carried by the connecting member for locking the hub against rotation in said circular opening.

4. A steering wheel comprising a hand ring, spiders secured to said hand ring, a connecting member journaled to said spiders, a hub journaled in the connecting member and secured to a steering post, a spring pressed pin slidable in the connecting member and adapted to engage the hub to lock the connecting member against rotation upon the hub, and means for locking the pin from engagement with the hub.

5. A steering wheel comprising a hand ring, spiders secured to the hand ring, a connecting member journaled to the spiders, a hub rotatably carried by the connecting member and secured to a steering-post, a spring pressed pin slidably mounted in the connecting member and adapted to engage the hub to lock the connecting member against rotation upon the hub, and a lock carried by the connecting member and adapted to engage the spring pressed pin for holding it from engagement with the hub, to permit the connecting member to rotate freely upon the hub.

6. A steering wheel comprising an arm rotatably mounted upon a steering post, a ring mounted on the arm for pivotal movement at an angle to the pivotal movement of the arm, and means adapted to lock said arm to the steering post, said arm being adapted to be moved into position parallel to the seat after the front wheels have been turned at an angle whereby to permit the ring to be moved into a position to permit free access to the seat.

7. A steering wheel comprising a hand ring, a connecting member pivotally secured thereto and mounted for rotation on a steering post for transmitting the torque of said ring to said post, and means to secure said connecting member for rotation with the steering post.

8. A steering wheel mechanism comprising a sleeve secured upon a steering shaft, a casing member rotatable around said sleeve adapted to be locked thereto, and a steering wheel journaled on said casing member at an axis transverse that of the steering shaft to permit tilting of the wheel into different planes.

9. A steering wheel comprising a hand ring, spiders secured to the hand ring, a connecting member journaled to said spiders and mounted for rotation on a steering post, means for locking the connecting member for rotation with the steering post, and means for retaining the spiders in fixed position on said connecting member.

10. A steering wheel comprising a hand ring, spiders secured to the hand ring, a connecting member journaled to said spiders and mounted for rotation on a steering post, means for locking the connecting member for rotation with the steering post, and resilient means interposed between the spiders and the connecting member for releasably retaining the hand ring in a plane substantially perpendicular to its axis of rotation.

11. A steering wheel comprising a hand ring, a connecting member journaled to said ring and mounted for rotation on a steering post, means for locking the connecting member for rotation with the steering post, and means for retaining the hand ring in fixed position on said connecting member.

12. A steering wheel comprising means adapted to be journaled to a steering post, a hand ring pivotally mounted on said journaled means and means for locking the journaled means to the steering post, whereby the torque of the steering wheel is transmitted through said journaled means to said steering post.

In testimony whereof I affix my signature in presence of two witnesses.

FORREST L. CANTRALL.

Witnesses:
E. B. ASH,
J. A. YATES.